UNITED STATES PATENT OFFICE.

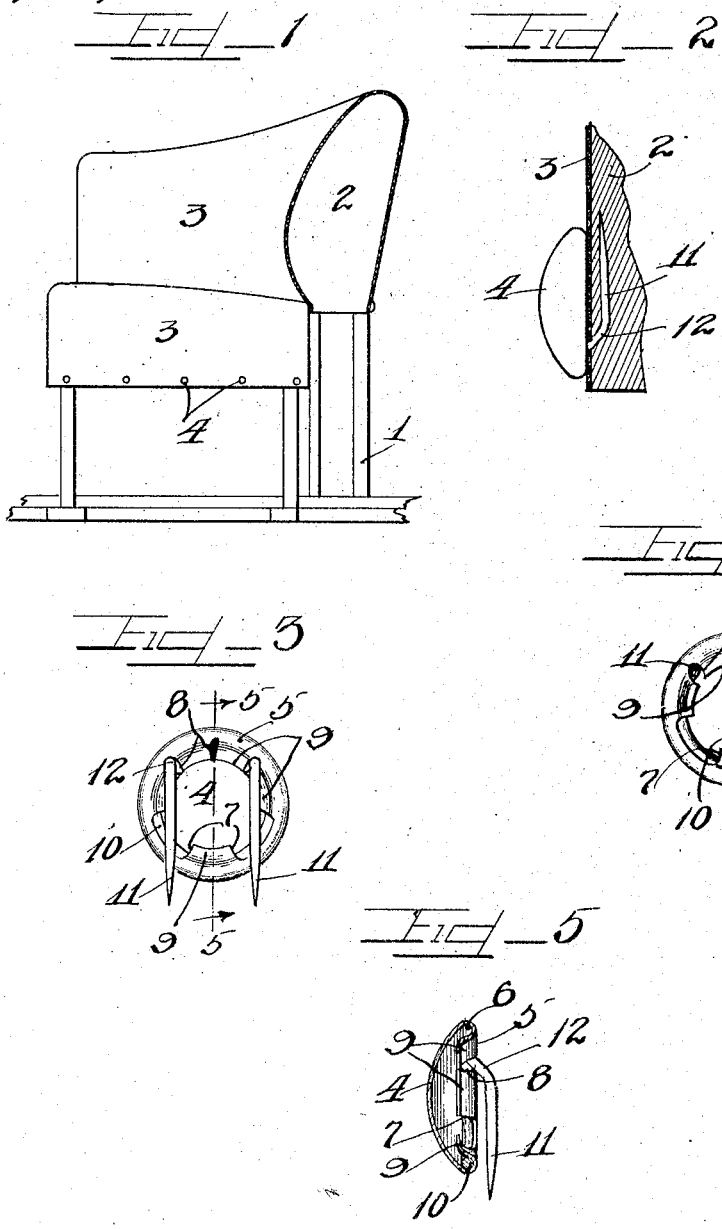

FREDERICK L. BECKER, OF CHICAGO, ILLINOIS.

SEAT-COVER PIN.

1,364,540.  Specification of Letters Patent.  Patented Jan. 4, 1921.

Application filed October 25, 1919. Serial No. 333,199.

*To all whom it may concern:*

Be it known that I, FREDERICK L. BECKER, a citizen of the United States, and a resident of the city of Chicago, in the county of Cook and State of Illinois, have invented certain new and useful Improvements in Seat-Cover Pins; and I do hereby declare that the following is a full, clear, and exact description of the same, reference being had to the accompanying drawings, and to the numerals of reference marked thereon, which form a part of this specification.

This invention pertains more particularly to an improved type of a removable seat cover pin, wherein an inwardly rolled flange of a button head has portions thereof cut away leaving retaining lugs adapted to engage over and hold the middle ring portion of a double pin member in position within the button head to hold the pins in a plane parallel to the button head flange, to permit the pins to be projected through the margin of an auxiliary seat cover to securely hold said cover in place.

It is an object of this invention to construct a seat cover pin adapted to readily secure an auxiliary cover upon a cushioned seat.

Another object of the invention is to construct a seat cover with a plurality of pin members.

It is a further object of this invention to construct a seat cover retaining member with a pair of parallel integrally connected pins for holding an auxiliary covering over a cushioned seat.

It is also an object of this invention to construct an auxiliary seat cover retaining device having a retaining member provided with a pin at each end thereof.

It is an important object of this invention to construct a seat cover pin of simple and inexpensive construction adapted to securely hold a seat cover on a cushioned seat.

Other and further important objects of this invention will be apparent from the disclosures in the drawings and specification.

The invention (in a preferred form) is illustrated in the drawings and hereinafter more fully described.

On the drawings:

Figure 1 is a sectional elevational view of a vehicle seat provided with a seat covering held in place by means of seat cover pins embodying the principles of this invention.

Fig. 2 is a detail section through a portion of the seat and cover, showing a seat cover pin in position.

Fig. 3 is a rear elevational view of a seat cover pin covering the principles of the invention.

Fig. 4 is a similar view with the pin ends removed.

Fig. 5 is a section taken on line 5—5 of Fig. 3.

As shown on the drawings:

The reference numeral 1 indicates as a whole, a vehicle seat having the cushion portions 2, thereof covered with auxiliary seat coverings 3. The auxiliary seat coverings may be made of mohair or any other suitable material removably secured in place by improved seat cover pins embracing the principles of this invention.

As shown in Figs. 3, 4 and 5, the seat cover retaining device embraces a button head 4, made of metal or other suitable material, which is stamped or pressed into a convex form of any desired shape. The margin of the button head 4, is curled or rolled inwardly to form an inturned flange 5 affording a groove 6 between said flange and the convex part of the button head. Portions of the flange 5, are cut away as at 7 and 8, to form retaining lugs or tongues 9.

Seated in the groove 6, is a curved middle or body portion 10, the ends of which are bent to project outwardly through two of the openings 8, and then downwardly to lie in a plane to the rear of and parallel to the plane of the flange 5. The projecting ends of the metal ring body portion 10, have the ends thereof tapered or pointed to afford a pair of parallel pins 11, the pointed ends of which extend beyond the edge of the flange 5, opposite the openings 8. The double pin member 10—11, is securely retained in position within the button head groove 6, by the retaining lugs 9. Rotation of the pin portion 10, in the groove 6, is prevented by the portions of the pins 11, where they project through the openings 8.

The operation is as follows:

When it is desired to cover the cushioned parts 2, of the seat 1, with auxiliary seat covers 3, the covers are first stretched over the cushioned seat, sides and back for which they have been made. The seat cover pins are then used to removably hold the covers in proper position by simply inserting the pins 11, points up, down or in any other direction desired, through the margins of the coverings and into the cushioned portions 2, until the bent portions 12, prevent further movement of the pins, as shown in Fig. 2. In this position, the button head 4, of each seat cover pin, presses flat against the margin of the covering 3, to hold the same in position. The two parallel pins 11, of each seat cover member serve to firmly hold the button head in place.

I am aware that many changes may be made, and numerous details of construction may be varied through a wide range without departing from the principles of this invention, and I therefore do not purpose limiting the patent granted, otherwise than necessitated by the prior art, and the appended claim.

I claim as my invention:

A dome shaped button with the edge turned toward the inside to form a groove, lugs on the margin of said edge extending farther toward the interior of said button, two of the spaces between said lugs being of a shape and size to accommodate wire of the size usually used for pins, a body of wire fitted into said groove and extending through said two spaces, the parts of said body beyond said spaces lying in a plane substantially parallel to the base of the dome and being pointed, the points lying in said last mentioned plane and said parts and points forming a continuous figure, whereby manipulation of the button can be made to cause the pins to enter a desired fabric.

In testimony whereof I have hereunto subscribed my name in the presence of two subscribing witnesses.

FREDERICK L. BECKER.

Witnesses:
FRED E. PAESLER,
EARL M. HARDINE.